United States Patent [19]

Kamiunten et al.

[11] Patent Number: 5,020,373

[45] Date of Patent: Jun. 4, 1991

[54] COMPOSITE FLOW METER

[75] Inventors: Shoji Kamiunten, Kamakura; Tetsuo Hisanaga, Yokohama, both of Japan

[73] Assignee: Yamatake-Honeywell Co., Ltd., Tokyo, Japan

[21] Appl. No.: 446,415

[22] Filed: Dec. 5, 1989

[30] Foreign Application Priority Data

Dec. 15, 1988 [JP] Japan .................................. 63-314936

[51] Int. Cl.$^5$ ........................... G01F 1/32; G01F 7/00
[52] U.S. Cl. ..................................... 73/861.22; 73/195
[58] Field of Search ............. 73/195, 196, 197, 861.22

[56] References Cited

U.S. PATENT DOCUMENTS

| | | | |
|---|---|---|---|
| 4,320,650 | 3/1982 | Kita | 73/195 |
| 4,565,098 | 1/1986 | Herzl | 73/861.22 |
| 4,733,559 | 3/1988 | Aine et al. | 73/195 |

FOREIGN PATENT DOCUMENTS 2177204  1/1987  United Kingdom ............ 73/195

*Primary Examiner*—Herbert Goldstein
*Attorney, Agent, or Firm*—Whitham & Marhoefer

[57] ABSTRACT

This flow meter uses two known flow responsive techniques and combines them in a unique structure and system to form an improved flow meter whose range extends from low to high flow rates. The meter comprises a flow tube with a region of reduced diameter between its inlet and outlet. A microbridge flow sensor of a suitable type known in the art, which responds to thermal changes caused by changes in the flow rate, is located in the region of reduced diameter. A post downstream of the microbridge sensor creates Karman vortices whose frequencies are a function of flow rate and which are detected through ports in the tube by a suitable detector. The output of the microbridge is linear from low flow rates to a mid range and the Karman flow meter output is linear from the mid range to high flow rates. A correction factor is applied to the thermal flow meter output. The correction factor is determined by a ratio of the Karman flow meter output to the thermal output for a flow rate in the mid range, allowing a smooth transition from thermal to Karman outputs and vice versa in the mid range.

3 Claims, 2 Drawing Sheets

COMPOSITE FLOW METER

BACKGROUND OF THE INVENTION

1. Field of the Invention

This invention relates to a composite flow meter, and more particularly, to a flow meter of this kind which is composed of a Karman vortex flow meter and a mircobridge flow sensor.

2. Description of the Prior Art

A composite flow meter conventionally employed in the art is such one that is composed of a microbridge sensor 1 and a fluidics flow meter 2 as shown in FIG. 1.

Such conventional composite flow meter composed of the microbridge sensor 1 and the fluidics flow meter 2 has a problem in that the complicated structure and large size of the fluidics flow makes it difficult to mount the microbridge sensor 1 at a location in the fluidics flow meter 2 and also reduce the size of the whole flow meter.

OBJECTS AND SUMMARY OF THE INVENTION

In view of the above-mentioned problem, it is the object of the present invention to provide a composite flow meter which is in a simple and small structure and can be manufactured at a low cost.

To achieve the above object, there is provided a composite flow meter comprising:

a Karman vortex flow meter for measuring a high flow range; and a thermal flow sensor for measuring a low flow range.

Preferably, the output signal value derived from the thermal flow sensor is corrected by the output signal value derived from the Karman vortex flow meter.

The above and other objects and features of the present invention will become apparent from the following detailed description of the preferred embodiments with reference to the accompanying drawings.

DETAILED DESCRIPTION OF THE PREFERRED EMBODIMENTS

Figure 2:
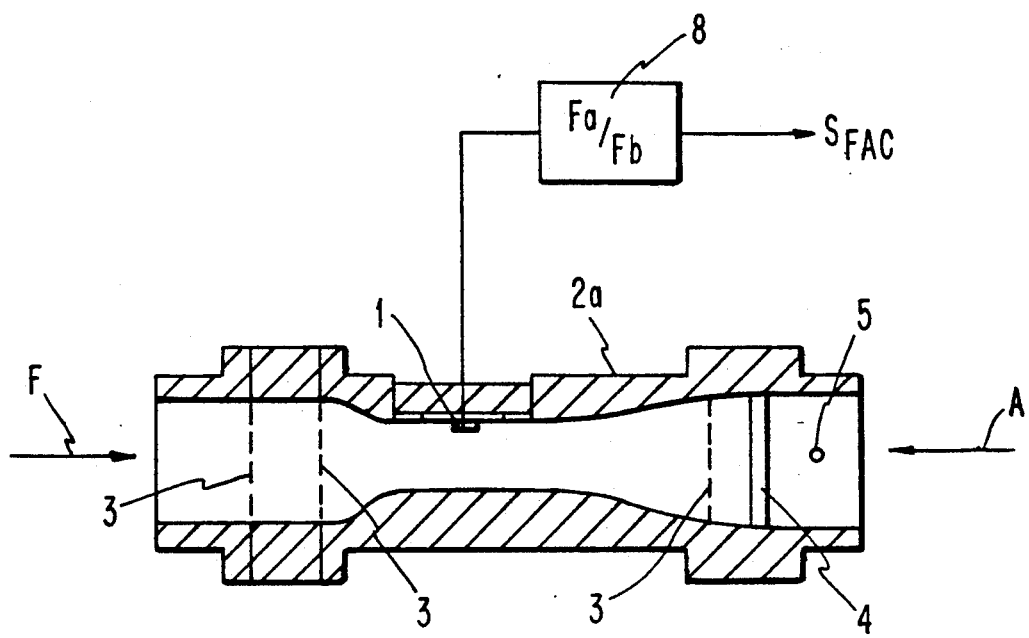
FIG. 2 is a cross-sectional view of an embodiment of the present invention.

FIG. 2 shows an embodiment of a composite flow meter according to the present invention. The shown composite flow meter includes a microbridge sensor 1, a Karman vortex flow meter 2a, a screen 3 for preventing disturbance in flow, a vortex generator 4 for generating Karman vortex and a pressure measuring bore 5 for detecting vortex. An arrow F indicates the direction of the flow.

The present embodiment measures a flow in a large amount range with the Karman vortex flow meter 2a and a flow in a small amount range with the microbridge sensor 1.

Such combination of the microbridge sensor 1 and the Karman vortex flow meter 2a makes its structure simpler, its size smaller, the mounting of the microbridge sensor 1 easier and its manufacturing cost lower than the conventional composite flow meter formed of a fluidics flow meter and a microbridge sensor.

Figure 3:
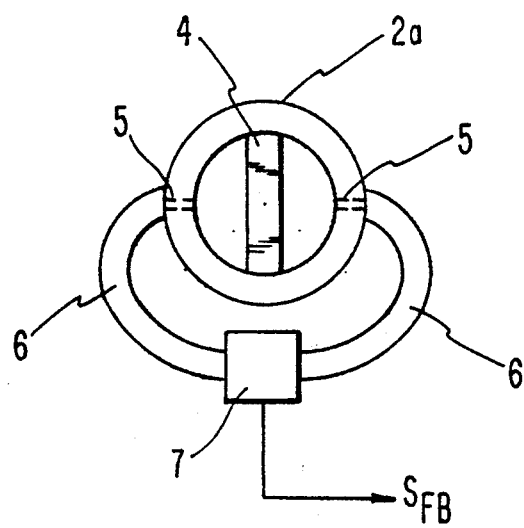
FIG. 3 is a side view taken from the direction shown by an arrow A.

FIG. 3 is a side view of the composite flow meter taken from the direction shown by an arrow A. In the same drawing, reference numeral 6 designates a tube and 7 a pressure/electric converting sensor.

Figure 4:
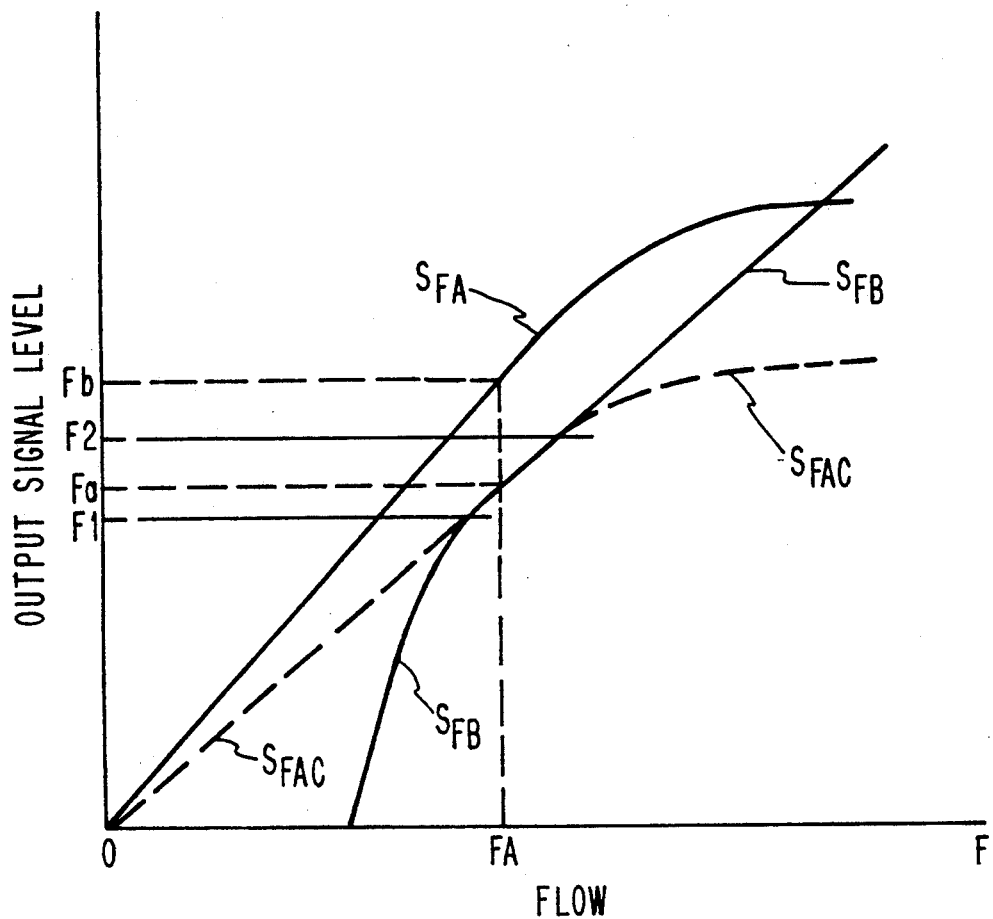
FIG. 4 is a graph showing output signal levels of the respective flow meter and sensor.
Figure 1:
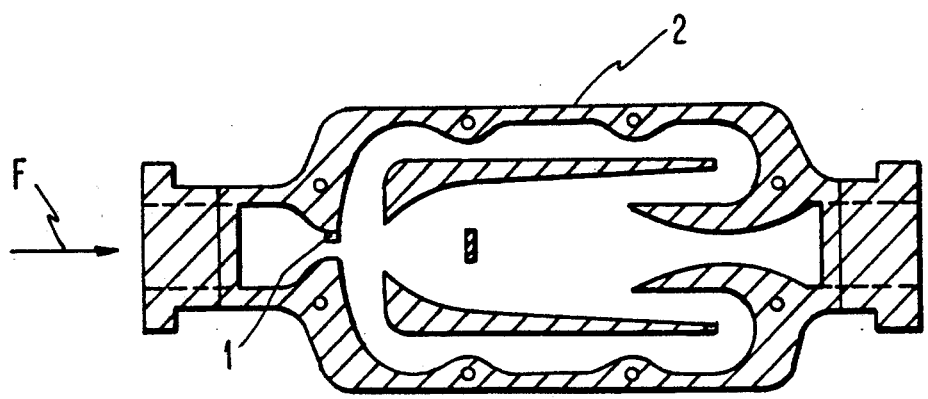
FIG. 1 is a cross-sectional view of a conventional composite flow meter.

Next, a method of correcting the output signal value from the microbridge sensor 1 with the output signal value from the Karman vortex flow meter 2a with reference to FIG. 4.

In FIG. 4, a curve $S_{FA}$ is a characteristic curve indicative of the output signal level from the microbridge sensor 1, a curve $S_{FB}$ a characteristic curve indicative of the output signal level from the Karman vortex flow meter 2a, and a curve $S_{FAC}$ a characteristic curve indicative of the corrected output signal level from the microbridge sensor 1. The abscissa of the graph represents the flow (F) and the ordinate the output signal level. The correction is effected between output signal levels F1 and F2. If it is assumed, for example, that the output level of the microbridge sensor 1 is Fb and that of the Karman vortex flow meter 2a Fa when the flow is FA, the correction coefficient k is calculated by dividing Fa by Fb (Fa/Fb). Therefore, the corrected output signal level Fb' of the microbridge sensor 1 is calculated by the following equation;

$$Fb' = k \cdot Fb = Fa$$

By this correction applied to the output of sensor 1 by a suitable circuit 8, continuity of the output signal can be maintained even if the microbridge sensor 1 is changed over to the Karman vortex flow meter 2a, and vice versa.

The output signal levels F1 and F2 for determining a correction range of the output signal are selected in the following manner. Assuming that a lower limit value which can be correctly measured by the Karman vortex flow meter 2a is represented by F0, and an upper limit value which can be correctly measured by the microbridge sensor 1 by F3, the levels F1 and F2 are selected so as to satisfy the following equation:

$$F0 \leq F1 < F2 \leq F3$$

The change-over between the microbridge sensor 1 and the Karman vortex flow meter 2a is effected between the output signal levels F1 and F2. The change-over can be automatically carried out by a microcomputer (not shown) which is provided with the output signal level from the Karman vortex flow meter 2a. Also, a signal processing circuit including a comparator may be used in place of the microcomputer.

Incidentally, since the Karman vortex flow meter is generally adapted to measure a narrower flow range than the fluidics flow meter, it is necessary to extend the measuring range of the microbridge sensor so that the composite flow meter of the present invention is applicable to the same flow range as the fluidics flow meter.

According to the present invention as described above, the composite flow meter can be made simple and small at a low cost by employing a Karman vortex flow meter for measuring a high flow rate range and a microbridge sensor for measuring a low flow rate range.

Further, the output signal value derived from the microbridge sensor is corrected by the output signal value from the Karman vortex flow meter which is more accurate than the microbridge sensor (thermal flow meter) for a long period, to thereby maintain the continuity and accuracy of the output signal in the whole range.

What is claimed is:

1. A composite flow meter comprising:
    a flow tube with an inlet and an outlet and a region of reduced diameter between said inlet and outlet;
    a thermal flow sensor for measuring flows extending from a low flow range to a mid flow range located in said reduced diameter section of said flow tube;
    a post and a pair of ports in said flow tube located downstream of said reduced diameter region forming a Karman vortex flow meter for measuring flows extending from said mid range to a high flow range.

2. A composite flow meter comprising:
    a flow tube with an inlet and an outlet and a region of reduced diameter between said inlet and outlet;
    a thermal flow sensor for measuring flows extending from a low flow range to a mid flow range located in said reduced diameter section of said flow tube;
    a post and a pair of ports in said flow tube located downstream of said reduced diameter region forming a Karman vortex flow sensor for measuring flows extending from said mid range to a high flow range;
    means for modifying the output of said thermal flow sensor by a factor determined by the ratio of the output of said Karman flow sensor to the output of said thermal flow sensor for a flow rate in said mid range.

3. A composite flow meter comprising:
    a Karman vortex flow meter for measuring a high flow range and producing an output signal indicative of flow;
    a thermal flow sensor for measuring a low flow range and producing an output signal indicative of flow; and
    means for correcting said thermal flow output signal by said Karman vortex flow meter output signal.

* * * * *